June 1, 1965     A. L. HARDY ETAL     3,186,652
COMMINUTING ASSEMBLY FOR A FOOD WASTE DISPOSER
Filed Sept. 26, 1963
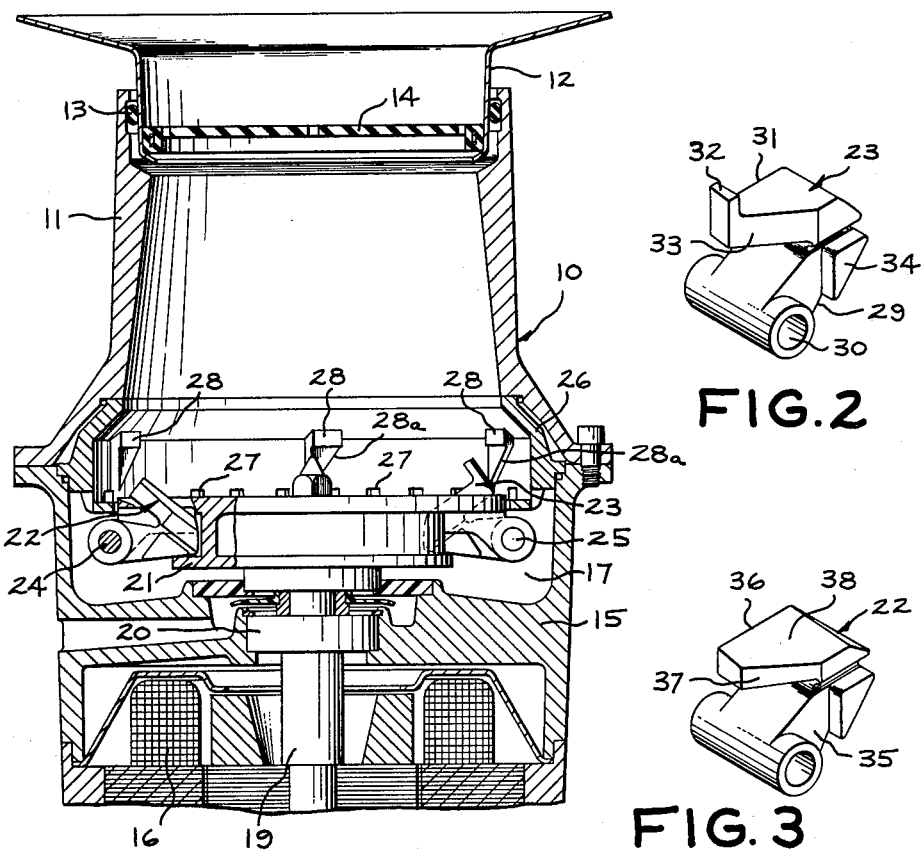
FIG. 1
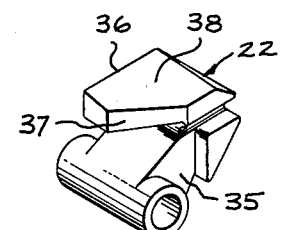
FIG. 2
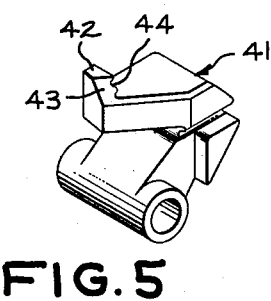
FIG. 3
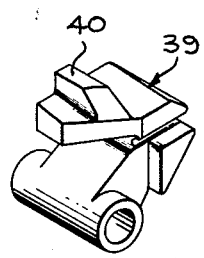
FIG. 4
FIG. 5
INVENTORS
ALBERT L. HARDY,
CHARLES E. HAUSER
BY & JAMES E. STINER
THEIR ATTORNEY United States Patent Office 3,186,652
Patented June 1, 1965

3,186,652
COMMINUTING ASSEMBLY FOR A FOOD
WASTE DISPOSER
Albert L. Hardy, Louisville, Ky., and Charles E. Hauser, Jeffersonville, and James E. Stiner, New Albany, Ind., assignors to General Electric Company, a corporation of New York
Filed Sept. 26, 1963, Ser. No. 311,806
7 Claims. (Cl. 241—257)

This invention relates generally to food waste disposers and, more particularly, to an improved comminuting assembly for a food waste disposer.

In order to enhance its commercial acceptance, a food waste disposer should effectively comminute all types of food waste. Additionally, a food waste disposer preferably will dispose of food waste in reasonably short time and without excessive power consumption. In the past, it was generally necessary to sacrifice one of these goals in order to achieve one or more of the others. For example, disposers designed for a high grinding rate generally consumed excessive power or, on the other hand, would not comminute all types of food waste. Similarly, a disposer designed to handle all types of food waste generally would have a low grinding rate for a mixed load of food waste.

Accordingly, it is an object of this invention to provide an improved comminuting assembly for a food waste disposer.

It is another object of this invention to provide an improved comminuting assembly which will handle virtually all types of food waste at a high grinding rate and with a reasonably low power consumption.

It is a further object of this invention to provide, in a food waste disposer comminuting assembly, an improved impeller mechanism.

Briefly stated, in accordance with one aspect of the invention, there is provided, in a food waste disposer, a comminuting assembly comprising a first impeller having an inclined top surface which tends to lift the food waste coming into contact therewith. A second impeller is provided and has a grinding surface which cooperates with a stationary grinding pad to comminute the food waste. The lifting action of the first impeller maintains the mass of food waste slightly elevated with respect to the second impeller to thereby control the depth into the food waste which the second impeller will cut. By having this depth so controlled, the second impeller will grind at its most efficient rate with resulting high grinding rate and low power consumption.

While the specification concludes with claims particularly pointing out and distinctly claiming the subject matter which is regarded as the invention, it is believed the invention will be better understood from the following description taken in connection with the accompanying drawing, in which:

FIGURE 1 is a partial sectional view of a food waste disposer embodying the present invention;

FIGURE 2 is a perspective view of a grinding impeller;

FIGURE 3 is a perspective view of a lifting impeller;

FIGURE 4 is a perspective view of a modified form of the impeller shown in FIGURE 3; and FIGURE 5 is a modified form of the impeller shown in FIGURE 2.

Referring now to the drawing, and particularly to FIGURE 1, there is illustrated a food waste disposer 10 in which the structure of the present invention has been incorporated. The disposer 10 includes a hopper 11 which is designed to receive and contain the food waste during the comminuting operation. The upper end of the hopper 11 is open and receives a sink flange 12 which is provided with a sealing means 13 disposed between the outer surface of the sink flange 12 and the inner surface of the hopper 11. A flexible splash guard 14 stretches across the inlet to the hopper 11 and is designed to allow the insertion of food waste and water into the hopper 11 while preventing the food waste from splashing out of the hopper 11 during comminuting operation.

Attached to the lower end of the hopper 11 is a casing 15 which houses an electric motor 16. The casing 15 also defines a drainage chamber 17 which receives the food waste after it has been comminuted and directs it to a discharge conduit (not shown) which interconnects chamber 17 to a conventional sewage system.

The motor 16 has a shaft 19 which extends upwardly through a bearing 20 and terminates at flywheel 21. The flywheel 21, therefore, rotates with the motor shaft 19.

A pair of impellers 22 and 23 are pivotally secured to the flywheel 21 by pins 24 and 25 respectively. Since the center of gravity of each of the impellers 22 and 23 is shown their respective pins 24 and 25, the impellers 22 and 23 swing outwardly under centrifugal force as the flywheel 21 rotates. A shredding ring 26 is disposed between the hopper 11 and the drainage chamber 17 and is provided with a plurality of openings 27. The openings 27 provide passageways for the comminuted food waste to enter the drainage chamber 17. The shredding ring 26 is also provided with at least one grinding pad 28 having an inclined front surface 28a which cooperates with the impellers to comminute food waste contained in the hopper 11.

The structure thus far described is essentially conventional and may be modified to a great extent without effecting the operation of the present invention. In the conventional apparatus similar to that shown in FIGURE 1, food waste is inserted into hopper 11 through the flexible splash guard 14 along with a continuous supply of water. The food waste settles to the bottom of hopper 11 whereupon it comes into contact with the rotating flywheel 21 and the impellers 22 and 23. In the conventional machine both of the impellers would be designed to comminute the food waste by grinding action between the impellers and the grinding pads 28. This operation would continue until all of the food waste in hopper 11 was comminuted into a finely divided substance which would be discharged through openings 27 into drainage chamber 17 and, from there, into the sewage system. However, the present invention contemplates the incorporation of novel impeller configurations to increase the grinding rate of the disposer while at the same time decreasing its power consumption.

In accordance with one aspect of the present invention, impellers having individual configurations and individual functions are incorporated into the comminuting assembly. Referring now to FIGURES 2 and 3, the configurations of two of the impellers of the present invention can be seen. In FIGURE 2, impeller 23 represents a comminuting or grinding impeller, i.e., an impeller which is designed to actively cooperate with grinding pads 28 of disposer 10 to grind food waste. On the other hand, impeller 22, illustrated in FIGURE 3, is designed primarily to lift the food waste and maintain it slightly elevated with respect to the flywheel to thereby control the depth into the food waste which impeller 23 will cut.

Referring again to FIGURE 2, impeller 23 has a lower portion 29 with a hole 30 extending therethrough. The hole 30 is adapted to receive a pin such as pin 25 shown in FIGURE 1 to secure impeller 23 to flywheel 21. Impeller 23 also has an upper portion 31 which is provided with an upwardly extending element 32. A portion of the leading edge of upper portion 31 is tapered or beveled as shown at 33. It is to be understood that the term leading edge indicates that edge which faces the direction of travel of impeller 23 as it rotates with flywheel 21. Impeller 23 is also provided with a projection 34 at each side which cooperates with the bottom surface of flywheel 21 to serve as a stop to limit the outward movement of the impeller as the flywheel 21 rotates.

During operation of the food waste disposer 10, the impeller 23 cooperates with grinding pads 28 in an essentially conventional manner. As the flywheel 21 rotates, impeller 23 pivots outwardly until element 32 comes into grinding relationship with grinding pads 28 and, as flywheel 21 continues to rotate, food waste is comminuted by the interaction between the element 32 and grinding pads 28. During comminuting, the upwardly extending element 32, since it does extend above the upper surface of the upper portion 31 of impeller 23, tends to catch fibrous materials such as, for example, corn husks and retains these fibrous materials in a position where they can be comminuted along with the non-fibrous food waste.

It has been found in practice that a food waste disposer provided with only one impeller such as that illustrated in FIGURE 2, and an appropriate counterbalance means opposite the impeller for the purpose of maintaining balance of the flywheel, will satisfactorily comminute food waste at a desirable grinding rate. However, it was also found in practice that excessive power consumption occurred when a food waste disposer was provided with only the single impeller 23. Experiments showed that the excessive power consumption was attributable primarily to the fact that the impeller 23 was taking too large of a bite into the food waste contained within hopper 11. That is, the depth into the food waste which the impeller was cutting during each revolution of the flywheel, was so great that it created excessive power consumption in the motor driving the disposer. To overcome this problem, impeller 22, as illustrated in FIGURE 3, was designed and incorporated into the disposer by mounting it to the flywheel opposite impeller 23.

Referring now to FIGURE 3, it can be seen that impeller 22 has a lower portion 35 essentially identical to that of lower portion 29 of impeller 23. Upper portion 36 has a bevel or taper 37 similar to bevel 33 of impeller 23; however, the rest of upper portion 36 has a different configuration from that of upper portion 31 of the impeller 23. Of particular importance is the top surface 38 of upper portion 36 which is sloped such that it is low at the leading edge of impeller 22 and is high at the trailing edge. With the sloped or inclined top surface 38, impeller 22 tends to lift the food waste contained within hopper 11 as it rotates with flywheel 21. The lifting action imparted to the food waste by impeller 22 limits the depth into the food waste which impeller 23 will cut as impeller 23 cooperates with shredding pads 28 to comminute the food waste.

It has been found in practice that a comminuting assembly comprising a pair of impellers such as 22 and 23 just described, will provide the same grinding rate as a disposer having only a single impeller such as impeller 23 but it will achieve this grinding rate at a significantly lower power consumption.

Referring now to FIGURES 4 and 5, there are illustrated modifications of the impellers shown in FIGURES 2 and 3. In FIGURE 4 impeller 39 is structurally identical to impeller 22 with the exception that an upwardly extending element 40 is provided on the top surface of impeller 39. Element 40 is designed to impart a tumbling action to large particles of food waste such as, for example, corn cobs within the disposer hopper. It has been found in practice that providing a tumbling action for large particles increases the comminuting efficiency of the disposer with respect to these large particles.

In FIGURE 5 there is illustrated a modified form of the impeller shown in FIGURE 2. Impeller 41 is identical to impeller 23 with two exceptions: the upwardly extending element 42 is provided with a bevel 43 and is also provided with serrations 44. Bevel 43 is designed to make an angle with the inclined front surface 28a of grinding pad 28 less than the friction slip angle so that when bones are comminuted, bones caught between bevel 43 and surface 28a are sheared rather than being forced against the shredding ring 26. In the absence of bevel 43, the downward forcing of bones being comminuted creates drag which consumes excessive power. This is especially true when the disposer is being driven by a high speed motor running at approximately 3500 r.p.m.

When the bevel 43 is incorporated into the impeller, a problem arises with respect to fibrous materils such as corn husks since they tend to slide off the upwardly extending element 42. For effective comminution of such fibrous materials it is necessary for the fibrous materials to remain draped over the upwardly extending element 42. To facilitate comminution of such fibrous materials, by retaining them in a draped relationship to the upwardly extending element 42, the aforementioned serrations 44 have been provided in one surface of the upwardly extending element 42. These serrations 44 tend to minimize slippage of corn husks and other fibrous materials from the upwardly extending element 42, thereby retaining them in grinding relationship with impeller 41 and grinding pads 28. Serrations 44, by being positioned on the back side of element 42, having negligible effect on bone comminution while having the desired holding effect on fibrous materials. Also, the wear rate on the serrations 44 due to abrasive substances is minimized by having the serrations positioned on the back side of element 42, away from the grinding action.

As will be evident from the foregoing description, certain aspects of the invention are not limited to the particular details of construction of the examples illustrated, and it is contemplated that various other modifications or applications will occur to those skilled in the art. It is therefore intended that the appended claims shall cover such modifications and applications as do not depart from the true spirit and scope of the invention.

What we claim as new and desire to secure by Letters Patent of the United States is:

1. A comminuting assembly for a food waste disposer comprising:
   (a) at least one stationary grinding pad,
   (b) a rotatable flywheel,
   (c) a first impeller carried by said flywheel adjacent the periphery thereof and having an inclined top surface to impart a lifting action to food waste coming into contact with said impeller, and
   (d) a second impeller carried by said flywheel and adapted to cooperate with said grinding pad to grind the food waste within the disposer,
   (e) said first impeller and said second impeller travelling in substantially the same path upon rotation of said flywheel.

2. A comminuting assembly for a food waste disposer comprising:
   (a) at least one stationary grinding pad,
   (b) a rotatable flywheel,
   (c) a first impeller carried by said flywheel adjacent the periphery thereof and having means to impart a lifting action to food waste coming into contact with said impeller,
   (d) said first impeller further having an element projecting upwardly from the top surface to provide a tumbling action upon large particles of food waste, and
   (e) a second impeller carried by said flywheel and adapted to cooperate with said grinding pad to grind food waste within the disposer,
   (f) said first impeller and said second impeller travelling in substantially the same path upon rotation of said flywheel.

3. A comminuting assembly for a food waste disposer comprising:
(a) at least one stationary grinding pad,
(b) a rotatable flywheel,
(c) a first impeller carried by said flywheel for pivotal movement radially outwardly as said flywheel rotates,
(d) said first impeller having an inclined top surface to impart a lifting action to food waste coming into contact with said impeller,
(e) a second impeller carried by said flywheel for pivotal movement radially outward as said flywheel rotates,
(f) said second impeller having an upwardly extending element with a grinding surface to cooperate with said grinding pad.

4. A comminuting assembly for a food waste disposer comprising:
(a) at least one stationary grinding pad,
(b) a rotatable flywheel,
(c) a first impeller carried by said flywheel for pivotal movement radially outwardly as said flywheel rotates,
(d) said first impeller having an inclined top surface to impart a lifting action to food waste coming into contact with said impeller,
(e) said first impeller further having an element projecting upwardly from the top surface to provide a tumbling action upon large particles of food waste, and
(f) a second impeller carried by said flywheel for pivotal movement radially outwardly as said flywheel rotates,
(g) said second impeller having an upwardly extending element with a grinding surface to cooperate with said grinding pad.

5. A comminuting assembly for a food waste disposer comprising:
(a) at least one stationary grinding pad having an inclined surface,
(b) a rotatable flywheel,
(c) a first impeller carried by said flywheel for pivotal movement radially outwardly as said flywheel rotates,
(d) said first impeller having an inclined top surface to impart a lifting action to food waste coming into contact with said impeller,
(e) said first impeller further having an element projecting upwardly from the top surface to provide a tumbling action upon large particles of food waste, and
(f) a second impeller carried by said flywheel for pivotal movement radially outwardly as said flywheel rotates,
(g) said second impeller having an upwardly extending element with a grinding surface to cooperate with said grinding pad,
(h) said upwardly extending element having a beveled leading edge adapted to cooperate with the inclined surface of said grinding pad to minimize drag during comminution of bones.

6. A comminuting assembly for a food waste disposer comprising:
(a) at least one stationary grinding pad having an inclined surface,
(b) a rotatable flywheel,
(c) a first impeller carried by said flywheel for pivotal movement radially outwardly as said flywheel rotates,
(d) said first impeller having an inclined top surface to impart a lifting action to food waste coming into contact with said impeller,
(e) a second impeller carried by said flywheel for pivotal movement radially outward as said flywheel rotates,
(f) said second impeller having an upwardly extending element with a grinding surface to cooperate with said grinding pad,
(g) said upwardly extending element having a beveled leading edge adapted to cooperate with the inclined surface of said grinding pad to minimize drag during comminution of bones,
(h) said upwardly extending element having serrations in one surface thereof to prevent fibrous materials from slipping over the inclined leading edge of said upwardly extending element.

7. A comminuting assembly for a food waste disposer comprising:
(a) at least one stationary grinding pad having an inclined surface,
(b) a rotatable flywheel,
(c) a first impeller carried by said flywheel for pivotal movement radially outwardly as said flywheel rotates,
(d) said first impeller having an inclined top surface to impart a lifting action to food waste coming into contact with said impeller,
(e) said first impeller further having an element projecting upwardly from the top surface to provide a tumbling action upon large particles of food waste, and
(f) a second impeller carried by said flywheel for pivotal movement radially outwardly as said flywheel rotates,
(g) said second impeller having an upwardly extending element with a grinding surface to cooperate with said grinding pad,
(h) said upwardly extending element having a beveled leading edge adapted to cooperate with the inclined surface of said grinding pad to minimize drag during comminution of bones,
(i) said upwardly extending element having serrations in one surface thereof to prevent fibrous materials from slipping over the inclined leading edge of said upwardly extending element.

References Cited by the Examiner

UNITED STATES PATENTS

| | | | |
|---|---|---|---|
| 2,902,228 | 9/59 | Higer | 241—257 |
| 2,952,288 | 9/60 | Schnell | 146—192 |
| 3,005,595 | 10/61 | Jenkins | 241—257 X |

J. SPENCER OVERHOLSER, *Primary Examiner.*